United States Patent [19]
Lane, Jr.

[11] 3,789,063
[45] Jan. 29, 1974

[54] OLEFIN OXIDATION CATALYST

[75] Inventor: Robert E. Lane, Jr., Lake Jackson, Tex.

[73] Assignee: The Dow Chemical Company, Midland, Mich.

[22] Filed: May 8, 1972

[21] Appl. No.: 251,189

[52] U.S. Cl............ 252/439, 260/604 R, 260/465.3
[51] Int. Cl.............................................. B01j 11/74
[58] Field of Search..................................... 252/439

[56] References Cited
UNITED STATES PATENTS

| | | | |
|---|---|---|---|
| 3,338,952 | 8/1967 | Callahan et al................. | 252/439 X |
| 3,649,562 | 3/1972 | Lane................................ | 252/439 |
| 3,658,927 | 4/1972 | Crain et al...................... | 252/439 X |
| 3,716,496 | 2/1973 | Yoshino et al.................. | 252/439 |

*Primary Examiner*—Patrick P. Garvin
*Attorney, Agent, or Firm*—William M. Yates et al.

[57] ABSTRACT

The vapor phase oxidation of isobutene to methacrolein or methacrylonitrile (when $NH_3$ is used as a reactant) is improved when an oxide of Na, K, Rb, Cs or Ca is added as a promoter to a catalyst containing the oxides of iron, molybdenum, tellurium and at least one of the oxides of rhenium, manganese and vanadium.

8 Claims, No Drawings

OLEFIN OXIDATION CATALYST

BACKGROUND OF THE INVENTION

The reaction of an olefin with $O_2$ in the presence of a catalyst for producing unsaturated aldehydes is well known. Also well known is the reaction of olefins with $O_2$ and $NH_3$ to produce the corresponding unsaturated nitrile. These reactions have been classically carried out in the presence of various catalyst systems, including $Cu_2O$, Group IV(b) metals plus V and Mn, platinum group metals with Group V(a) promoters, phosphorous-containing catalysts, and, most recently, Te promoted catalyst systems.

U.S. Pat. No. 3,331,871 teaches a catalyst, $Mo_{80-0}Ni_{160-800}TeO_{25-375}Re_{1-6}$, for the oxidation of olefins. However, it is reported therein that butenes "are converted primarily to carbon oxides, with only small amounts of unsaturated aldehydes or acids having four carbon atoms."

U.S. Pat. No. 3,401,197 reports a catalyst, $Mo_{20}Te_{1-10}$ Group VIII metal$_{2-20}$P$_{2-20}$O$_{39-120}$, for the oxidation of olefins.

Other molybdenum oxide-containing catalysts are known for preparing unsaturated aldehydes and acids from unsaturated hydrocarbons. One of these (U.S. Pat. No. 3,401,198) employs molybdenum oxide, telluruium oxide and an alkaline earth metal phosphate. U.S. Pat. No. 3,387,038 employs molybdenum oxide, an oxide of a group IIA metal, eg. magnesium or calcium and a promoter, among which are included iron, bismuth, antimony, tin and tellurium. U.S. Pat. No. 3,326,819 employs as a promoter a calcium or barium compound with a mixture of the oxides of antimony and tin. Other compounds of metals such as titanium, vanadium, iron, manganese and nickel may be used in place of, or together with, the calcium or barium compounds.

A U.S. patent recently issued to the present inventor (No. 3,649,562) teaches the preparation of aldehydes and nitriles (when employing $NH_3$ as a reactant) over a catalyst consisting essentially of oxides of iron, molybdenum, tellurium and at least one of the oxides of rhenium, manganese or vanadium.

Additional teachings of catalysts useful for making aldehydes from olefins may be found in U.S. Pat. Nos. 3,451,945 and 3,322,687.

SUMMARY OF THE INVENTION

It has now been discovered that when the catalyst (described in U.S. Pat. No. 3,649,562) consisting essentially of the oxides of iron, molybdenum, tellurium and at least one of the oxides of rhenium, manganese and vanadium is promoted with one of the oxides of sodium, potassium, rubidium, cesium and calcium or mixtures thereof that the yield of methacrolein or methacrylonitrile is unexpectedly and substantially improved when the vapor phase oxidation of isobutylene is conducted in the presence of such catalyst. The oxide promoters are employed in amounts such that the atomic ratio of the metal to the other metals in the catalyst is from about 20 to 300 and preferably from about 50 to 200. Thus, an improved catalyst composition suitable for the oxidation of isobutylene to methacrolein and methacrylonitrile consists essentially of the oxides of Fe, Mo, Te and at least one of Re, Mn and V together with at least one promoter selected from the group consisting of oxides of Na, K, Rb, Cs, Ca and mixtures thereof, wherein the proportions of such oxides provides an atomic ratio of metals in accordance with the formula:

$Fe_xMo_yTe_zM\ Q_n$ where $x$ is 50 to 700, $y$ is 500 to 1,300, $z$ is 20 to 80 and $n$ is 20 to 300 and wherein M is Re, Mn, V or mixtures thereof and Q is Na, K, Rb, Cs or Ca.

Potassium has been found to be an especially good promoter in the process of the invention as illustrated by the following compositions:

$Fe_{600}Mo_{1000}Te_{75}Re\ K_{191}$
$Fe_{600}Mo_{1000}Te_{75}Re_1K_{80}$
$Fe_{500}Mo_{500}Te_{50}Re_1K_{100}$
$Fe_{50}Mo_{100}Te_{20}Re_1K_{50}$
$Fe_{300}Mo_{600}Te_{40}Re_1K_{77}$
$Fe_{700}Mo_{1300}Te_{80}Re_1K_{150}$

In like manner metal oxide catalysts having the following metal ratios were prepared in which sodium, cesium and calcium replaced the potassium:

$Fe_{600}Mo_{1000}Te_{75}Re_1Na_{125}$
$Fe_{600}Mo_{1000}Te_{75}Re_1Cs_{77}$
$Fe_{600}Mo_{1000}Te_{75}Re_1Ca_{172}$

The utilization of these catalysts is shown in Table I.

The oxidation and ammoxidation reactons of olefins and their equivalents are well known in the art. Operating conditions for the new catalysts are essentially the same as for known metal oxide catalysts. Suitably, the reactants should be contacted at a temperature of from about 200° to 500°C., preferably at 300° to 400°C and at 1–2 atmospheres or at pressure conditions which will keep the desired products in the vapor phase. An inert diluent may be utilized, such as nitrogen, steam, $CO_2$, and saturated hydrocarbons.

A mole ratio of $O_2$/olefin of 0.1/1 to 15/1 is suitable while 0.5/1 to 6/1 is preferred. A mole ratio of diluent/$O_2$ of 0/1 to 50/1 is also suitable, while 15–65 volume percent of total feed is preferred. In the ammoxidation reaction, a mole ratio of $NH_3$/isobutylene of from 0.5 to 10 is acceptable, while as little as possible to effect complete conversion of aldehyde to nitrile is preferred.

Oxygen and oxygen-containing gases, such as air, are suitable for the oxidizing agent. Ammonia and lower primary alkyl amines and alkylene diamines, such as methylamine, n-butylamine and ethylenediamine, are suitable for the ammoxidation reaction. The product obtained using primary amines, in place of $NH_3$, however, is a Schiff base rather than a nitrile.

Products which can be prepared from isobutylene include methacrolein and methacrylonitrile.

The catalysts of this invention are prepared by combining the metal salts or oxides in water in a flask with stirring. If neutralization is desired (may be necessary when metal supports are used) ammonia solution is added until the neutral point is reached. The product is transferred to a tray where stirring and warming in air dehydrates the slurry. A support may be added during the dehydration. The product is then broken up for use, or powdered and pelleted. Molybdenum is usually added as ammonium-p-molybdate, but $MoO_3$ or other Mo compounds are acceptable. Similarly, ammonium-m-vanadate, $V_2O_5$ and similar compounds may be used as the vanadium component. Iron and manganese may be added as nitrates, oxides or other salts; tellurium is usually added in the form of the oxide, $TeO_2$. Tellurium metal or a metal tellurate may be dissolved in an acid, e.g. HCl, before use. Rhenium may be added as perrhenic acid or as a salt of the metal.

The promoter metal oxides may be added as soluble salts of the metals. Thus, sodium, potassium, cesium, rubidium and calcium may be added to the solution for the preparation of the solution for the preparation of the catalyst as carbonates, chlorides, nitrates, and the like which are soluble in water or aqueous acid solutions.

Supports may be carborundum, firebrick, silica, alumina, alundum or similar commercial supports known to the art. The preferred supports are metal particles of good heat capacity and heat transfer properties such as aluminum granules, copper, silver or lead shot or iron particles. Surface area of the catalyst is preferably 5 to 50 sq. meters/gram.

Specific Embodiments
Example 1 - Catalyst Preparation

Distilled water (300–400ml.) was placed in a 2-liter, 4-necked round-bottomed, borosilicate flask equipped with a condenser, stirrer, thermometer, pressure-equalizing addition funnel and heating mantle. Ammonium heptamolydate·4H$_2$O (88.3 g.) was added to the water and the stirring mixture was warmed to 50°C. Ferric nitrate·9H$_2$O (121.1 g.) was dissolved in 250 ml. H$_2$O and the solution was added dropwise to the flask.

Perrhenic acid (0.125 g.) was dissolved in 10 ml. of water and was poured into the flask. Tellurium dioxide (5.98 g.) was added slowly to stirred concentrated HCl solution (35.50 ml.); when dissolved, the solution was added cautiously dropwise to the flask. Stirring was continued and potassium carbonate (6.6 g.) was added. The product was poured into a glass tray which was heated on a steam cone under an infrared lamp with constant stirring until the product solidified. The product was calcined at 300°C for 2 hours. The solid remaining was a light green, yellow, or brown lumpy material, weighing about 100 grams. It was broken into pieces, powdered and pelleted to give good pellets of low fines content.

The above catalyst contained the oxides of Fe, Mo, Te, Re and K in proportions such that the ratios of the metal atoms was 600:1,000:75:1:191, respectively. Other catalysts were made in similar manner wherein calcium hydroxide, cesium nitrate and sodium carbonate were used in place of the potassium carbonate. Salts such as rubidium chloride, cesium nitrate, potassium nitrate and sodium chloride also can be used.

Example 2 - Oxidation Reactions

The reactors were ½ inch or ⅜ inch stainless steel tubes (78 inches long), arranged vertically, with Nichrome wire spiral catalyst supports at the bottom. The flow was downward.

The reactor tubes were housed in a shell (6 inch I.D. by 4 feet long) which contained 2 gallons of polyphenyl ether (bathing 48 inches of the reactor). The bath was heated by 4 immersion heaters and 4 wall heaters. The unit was well insulated. Thermocouples were placed every 6 inches vertically and a thermoswitch (2 feet from the reactors' bottom) was present to prevent runaway heating in case of vacuum pump failure. Full vacuum produced about 4 mm. Hg pressure in the reactor shell.

The reactors temperatures varied between about 330° and 370°C (depending upon the vacuum setting) where contacting the liquid and about 325° to 365°C where contacting the vapor. The reported reaction temperature was the measured temperature of the boiling fluid, since the catalyst volume was adjusted to give a level below the top of the heat transfer liquid in the reactors' shell. The vapor area above the catalyst zone acted as a preheater zone.

Results are given in Tables I and II below. Contact time was calculated from the formula:

$$\text{Contact time, sec.} = \frac{\text{Bulk cat. vol., cc.}}{\text{Gas feed flow, cc/min.}} \times \frac{60 \text{ Sec.}}{\text{Min.}}$$

$$\times \frac{\text{Room Temp. °K}}{\text{Reactor fluid °K}} \times \frac{\text{Pressure at reactor inlet, psia.}}{\text{Atmospheric pressure psia}}$$

When reactor inlet pressure was less than 2 psig, no pressure correction was used in the above formula. All of the following runs were at pressures below 2 psig, so no pressure correction was required.

TABLE I

OXIDATION OF ISOBUTENE USING SELECTED PROMOTERS

| | | | Gas Vol. % | | | | | To Yield | | |
|---|---|---|---|---|---|---|---|---|---|---|
| Run | T°C | Contact Time Sec. | Feed C$_4$H$_8$ | Air | N$_2$ | Promoter Atomic Ratio | Olefin Conv. % | CO$_2$ | CO | Methacrolein |
| 1 | 335 | 2 | 2.1 | 58.9 | Bal. | Li(107) | 99.9 | 24.6 | 13.7 | 55.8 |
| 2 | 350 | 3 | 1.5 | 58.9 | Bal. | K(191) | 99.9 | 14.8 | 5.2 | 81.5 |
| 3 | 335 | 3 | 1.8 | 58.9 | Bal. | K(191) | 98.0 | 13.3 | 4.7 | 74.5 |
| 4 | 335 | 2 | 2.2 | 58.9 | Bal. | Na(125) | 99.8 | 12.2 | 3.5 | 73.9 |
| 5 | 335 | 6 | 2.2 | 58.9 | Bal. | Ba(65) | 99.9 | 41.5 | 15.5 | 34.7 |
| 6 | 340 | 6 | 1.7 | 58.9 | Bal. | None | 96.0 | 27.9 | 14.6 | 57.5 |
| 7 | 335 | 15 | 1.8 | 58.9 | Bal. | Cs(77) | 78.7 | 9.9 | 2.7 | 78.0 |
| 8 | 335 | 5 | 1.9 | 58.9 | Bal. | None | 77.0 | 27.9 | 8.9 | 47.5 |
| 9 | 335 | 6 | 1.5 | 58.9 | Bal. | Ca(172) | 49.0 | 6.2 | 4.7 | 70.2 |
| 10 | 335 | 4 | 1.6 | 58.9 | Bal. | None | 51.6 | 51.6 | 8.46 | 50.7 |

In the above Table I, Runs 1 and 5 are not examples of the invention, but are shown to illustrate the unexpected properties of the promoters selected from Group IA and Group IIA. Thus, Li and Ba do not have the property of promoting the catalyst. Runs 6, 8 and 10 are illustrative of the catalyst without the promoters and are presented to show a comparison with the promoted catalyst at substantially the same conversions. Thus, Run 6 may be compared with Runs 1–5 at similar high conversions; while Run 8 compares with Run 7 and Run 10 compares with Run 9 at substantially the same (though lower) conversions.

Other runs are illustrated in Table II which utilize different conditions (including the use of steam and ammonia) which result in different conversions and yields.

TABLE II

OXIDATION OF ISOBUTENE

| Run | T°C | Contact Time Sec. | Feed Gas, Vol. % | | | | Promoter Atomic Ratio | Conv. % | $CO_2$ | CO | Methacrylonitrile | Methacrolein |
|---|---|---|---|---|---|---|---|---|---|---|---|---|
| | | | $C_4H_8$ | Air | $N_2$ | $NH_3$ | | | | | | |
| 11 | 340 | 6 | 2.0 | 58.9 | Bal. | — | K(191) | 58.9 | 7.8 | 4.5 | — | 76.4 |
| 12 | 330 | 4 | 1.62 | 69.7 | 28.7* | — | K(191) | 85.8 | 9.9 | 2.8 | — | 78.5 |
| 13 | 335 | 6 | 1.62 | 58.0 | Bal. | — | K(191) | 87.0 | 13.0 | 4.1 | — | 78.8 |
| 14 | 330 | 6 | 1.82 | 58.9 | 36.0 | 3.3 | K(191) | 91.0 | 16.4 | 2.5 | 53.7 | 8.6 |
| 15 | 350 | 4.8 | 1.79 | 58.9 | Bal. | — | K(191) | 64.9 | 12.1 | 3.0 | — | 80.4 |

* Steam replaced nitrogen in this run

Note particularly that Run 11 uses a somewhat higher proportion of isobutylene in the feed and that Runs 12 and 13 compare favorably even though steam is used in the former in place of the nitrogen as a diluent. Run 14 shows that methacrylonitrile is produced when ammonia is introduced into the feed gas. A higher than usual temperature is employed in Run 15 with yield of methacrolein remaining high.

Propylene was also fed to the catalyst disclosed in the inventor's earlier patent and then the same catalyst containing the promoters of the instant invention was used to oxidize propylene. There was no substantial difference in the yield of acrolein obtained with and without the promoter, thus giving further evidence of the unexpected nature of the instant disclosure with respect to the oxidation of isobutylene.

I claim:

1. An improved catalyst composition suitable for the oxidation of isobutylene to methacrolein and methacrylonitrile consisting essentially of the oxides of Fe, Mo, Te and at least one of Re, Mn and V together with at least one promoter selected from the group consisting of oxides of Na, K, Rb, Cs, Ca and mixtures thereof, wherein the proportions of such oxides provides an atomic ratio of metals in accordance with the formula:

$$Fe_xMo_yTe_zM\ Q_n$$

where $x$ is 50 to 700, $y$ is 500 to 1,300, $z$ is 20 to 80 and $n$ is 20 to 300 and wherein M is Re, Mn, V or mixtures thereof, and Q is Na, K, Rb, Cs or Ca.

2. The catalyst composition of claim 1 in which M is rhenium and Q is potassium.

3. The catalyst composition of claim 1 in which M is rhenium and Q is sodium.

4. The catalyst composition of claim 1 in which M is rhenium and Q is cesium.

5. The catalyst composition of claim 1 in which M is rhenium and Q is calcium.

6. The catalyst composition of claim 1 wherein the atomic ratio of the metals is $Fe_{600}Mo_{1000}Te_{75}Re$, $Q_n$, where $n$ is 50 to 200.

7. The catalyst composition of claim 6 wherein Q is potassium.

8. The catalyst composition of claim 1 wherein M is rhenium, Q is potassium, $x$ is 600, $y$ is 1,000, $z$ is 75 and $n$ is 191.

* * * * *